(12) United States Patent
Ichinose et al.

(10) Patent No.: US 7,659,637 B2
(45) Date of Patent: Feb. 9, 2010

(54) VARIABLE SPEED WIND POWER GENERATION SYSTEM

(75) Inventors: Masaya Ichinose, Hitachiota (JP); Shinya Oohara, Hitachi (JP); Motoo Futami, Hitachiota (JP); Tadashi Sodeyama, Hitachi (JP); Kazuhiro Imaie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 74 days.

(21) Appl. No.: 11/769,753

(22) Filed: Jun. 28, 2007

(65) Prior Publication Data

US 2008/0001411 A1    Jan. 3, 2008

(30) Foreign Application Priority Data

Jun. 28, 2006    (JP) .............................. 2006-177489

(51) Int. Cl.
*F03D 9/00*    (2006.01)
*H02P 9/04*    (2006.01)

(52) U.S. Cl. .......................................... 290/55; 290/44
(58) Field of Classification Search .................. 290/44, 290/55, 54; 415/7, 4.2, 2.1; 60/398; 416/7, 416/132 B
See application file for complete search history.

(56) References Cited

U.S. PATENT DOCUMENTS

| | | | | |
|---|---|---|---|---|
| 4,435,646 A | * | 3/1984 | Coleman et al. ............... | 290/44 |
| 4,584,486 A | | 4/1986 | Quynn | |
| 5,083,039 A | * | 1/1992 | Richardson et al. ........... | 290/44 |
| 7,332,894 B2 | * | 2/2008 | Ichinose et al. ............... | 322/29 |
| 2005/0017512 A1 | * | 1/2005 | Kikuchi et al. ................ | 290/44 |
| 2006/0028025 A1 | * | 2/2006 | Kikuchi et al. ................ | 290/44 |
| 2006/0214429 A1 | * | 9/2006 | Kikuchi et al. ................ | 290/44 |
| 2008/0106099 A1 | * | 5/2008 | Ichinose et al. ............... | 290/44 |

FOREIGN PATENT DOCUMENTS

| | | |
|---|---|---|
| EP | 1 467 094 | 10/2004 |
| JP | 2003134890 A  * | 5/2003 |
| JP | 2006-050835 | 2/2006 |

OTHER PUBLICATIONS

U.S. Appl. No. 11/751,742, filed May 25, 2007, Ichinose et al.
Z. Lubosny: "Wind Turbine Operation in Electric Power Systems", Springer Verlag 2003, pp. 150, 151, 230.

* cited by examiner

*Primary Examiner*—Julio C. Gonzalez
(74) *Attorney, Agent, or Firm*—Antonelli, Terry, Stout & Kraus, LLP.

(57) ABSTRACT

A variable speed wind power generation system including a wind turbine, a generation power command unit for generating a generation power command value based on a state quantity of the wind turbine and a generator control unit for controlling the power converter for controlling electric power of the generator, wherein the generator control unit operates to regulate the generation power of the generator in order to change the generation power amount according to the generation power command value.

14 Claims, 12 Drawing Sheets

OUTPUTS "1" WHEN Pa > A
OR "0" OTHERWISE

VARIABLE SPEED WIND POWER GENERATION SYSTEM

CROSS-REFERENCE TO RELATED APPLICATION

The present application relates to subject matters described in a co-pending patent application Ser. No. 11/751,742, filed on May 25, 2007 entitled "WIND POWER GENERATION APPARATUS, WIND POWER GENERATION SYSTEM AND POWER SYSTEM CONTROL APPARATUS" by Masaya Ichinose, et al. and assigned to the assignees of the present application.

BACKGROUND OF THE INVENTION

The present invention relates to a wind power generation system with variable rotating speed of a generator.

A wind power generation apparatus receives wind energy on its blades and then converts it into rotational energy to generate rotational torque at a rotor of a generator. The wind power generation apparatus produces electric power from wind-induced torque by generating a magnetic field at the rotor (or stator or both of them). It supplies the produced electric power to a power system or load through electric wires.

Since a wind power generation system utilizes wind energy, it has a problem that the generated power fluctuates resulting in voltage fluctuation of the power system connected.

U.S. Pat. No. 5,083,039 discloses a wind power generation system which utilizes torque control for generation control and performs power factor control in order to prevent voltage fluctuation.

SUMMARY OF THE INVENTION

Electric power generated by a wind power generation system fluctuates due to wind energy. This causes voltage fluctuation in a power system of the wind power generation system.

A wind power generation system described in the Japanese Patent No. 3435474 performs torque control in its generator system and therefore the generated active power varies with the fluctuation of the rotating speed of the wind turbine.

With power factor control, since the reactive power output is small when the generated power is small, it may not be possible to obtain reactive generation power amount sufficient to suppress voltage fluctuation.

To attain the above-mentioned subjects, the present invention provides a variable speed wind power generation system which comprises:

a wind turbine wherein at least one blade is attached to a rotatable shaft;

a generator having a rotor that rotates together with the shaft of the wind turbine;

a power converter having an active switch for controlling the electric power of the generator;

blade angle change means for changing the angle of the blade according to a blade angle command value;

generation power command means for generating a generation power command value based on a state quantity of the wind turbine; and generator control means for controlling the power converter to control the active switch;

wherein the generation power command means determines a generation power command value based on a wind speed, and wherein the generator control means includes means for controlling the active switch to regulate the generated power of the generator in order to change the generation power amount according to the generation power command value.

In addition, to attain the above-mentioned subjects, the present invention provides a variable speed wind power generation system which comprises:

a wind turbine wherein at least one blade is attached to a rotatable shaft;

a generator having a rotor that rotates together with the shaft of the wind turbine;

a power converter having an active switch for controlling the electric power of the generator;

blade angle change means for changing the angle of the blade according to a blade angle command value;

generation power command means for generating a generation power command signal based on a state quantity of the wind turbine;

generator control means for controlling the power converter to control the active switch;

wherein the generation power command means includes means for obtaining a generation power command value and a rotating speed command value from the wind speed; and means for changing a blade angle command value according to the deviation of a rotating speed detection value from the rotating speed command value; and wherein the generator control means includes means for controlling the active switch to regulate the generated power of the generator in order to change the generation power amount according to a generation power command value.

In addition, to attain the above-mentioned subjects, the present invention provides a variable speed wind power generation system which comprises:

a wind turbine wherein at least one blade is attached to a rotatable shaft;

a generator having a rotor that rotates together with the shaft of the wind turbine;

a power converter having an active switch for controlling the electric power of the generator;

blade angle change means for changing the angle of the blade according to a blade angle command value;

generation power command means for generating a generation power command value based on a state quantity of the wind turbine; and generator control means for controlling the power converter to control an active switch;

wherein the generation power command means includes means for obtaining a blade angle command value and a rotating speed command value from the wind speed; and means for changing the generation power command value according to the deviation of a rotating speed detection value from the rotating speed command value; and wherein the generator control means includes means for controlling an active switch to regulate the generated power of the generator in order to change the generation power amount according to a generation power command value.

In addition, to attain the above-mentioned subjects, the present invention provides a variable speed wind power generation system which comprises:

a wind turbine wherein at least one blade is attached to a rotatable shaft;

a generator having a rotor that rotates together with the shaft of the wind turbine;

a power converter having an active switch for controlling the electric power of the generator; and blade angle change means for changing the angle of the blade according to a blade angle command value;

wherein reactive power can be output independently of active power based on a reactive power command value.

According to the variable speed wind power generation system of the present invention, since the fluctuation of generated power to be outputted to a power system can be made smaller in comparison with the conventional torque control method, it is possible to reduce the effect on the voltage fluctuation of the power system.

Additionally, according to the variable speed wind power generation system of the present invention, the reactive generation power amount can be determined independently of the active generation power amount by providing reactive power control means. Accordingly, large reactive power can be outputted even with small generated power, realizing reactive power output according to power system conditions.

Other objects, features and advantages of the invention will become apparent from the following description of the embodiments of the invention taken in conjunction with the accompanying drawings.

DESCRIPTION OF THE EMBODIMENTS

The present invention has been achieved by providing a wind power generation system with a controller which outputs generated power through active power control.

An object to compensate reactive power required by a system was accomplished by providing the wind power generation system with a controller which controls reactive power based on a received reactive power command.

Embodiment 1

Figure 1:
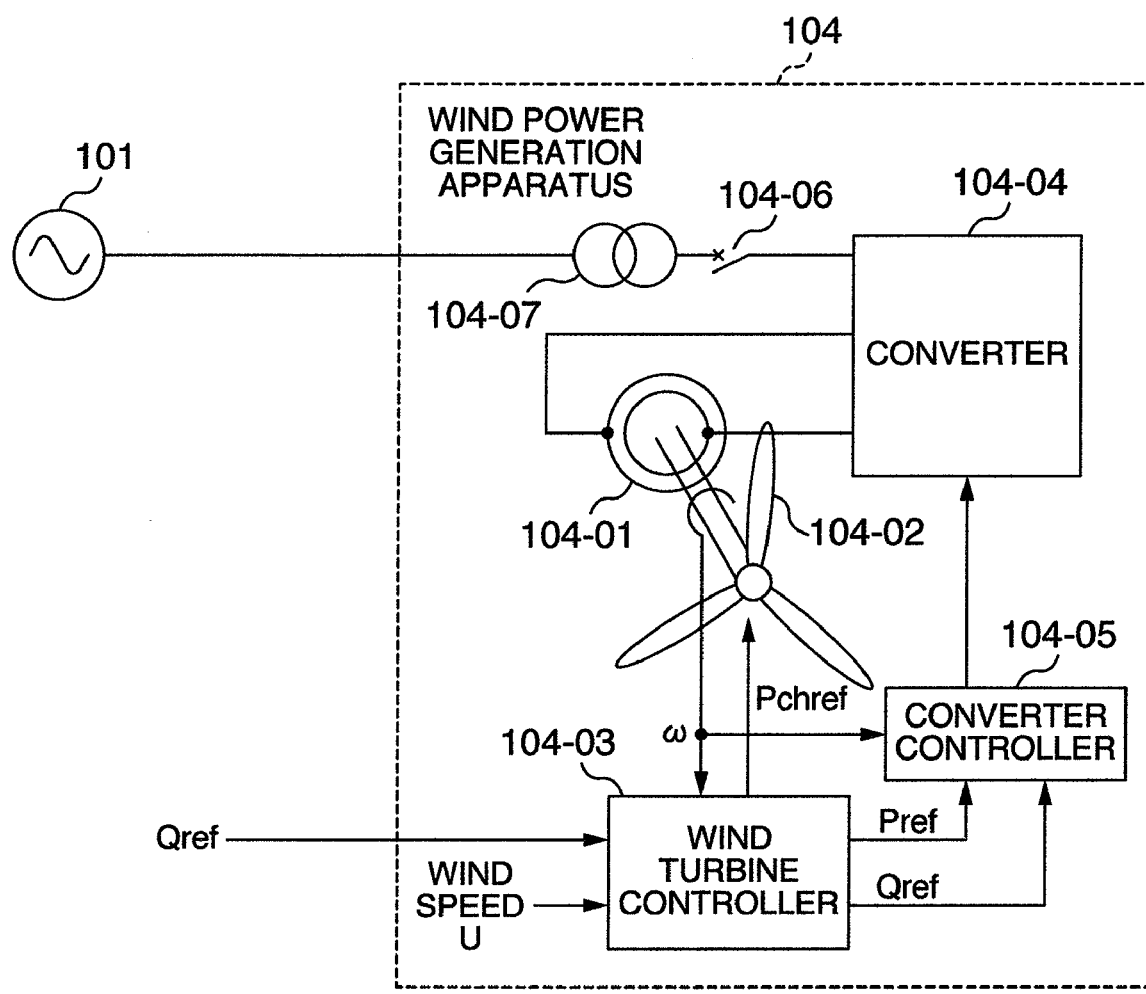
FIG. 1 is a diagram showing a circuit configuration of a power system and a wind power generation apparatus.

FIG. 1 is a single line diagram showing a system configuration according to an embodiment of the present invention. The configuration of a power system for electric power transmission will be explained below. Power generation equipment 101 of the power system can be simply considered as a power supply if it has a large capacity. The power from the power generation equipment 101 of the power system is transmitted to homes, buildings, factories, etc. via power lines.

A wind power generation apparatus 104 is connected to the power lines through a transformer 104-07 for coupling with the power system.

The wind power generation apparatus 104 includes mainly a wound-rotor induction generator 104-01, blades 104-02, a wind turbine controller 104-03, a converter (excitation apparatus) 104-04, and a converter controller 104-05.

The blades 104-02 are mechanically connected to the rotor of the generator 104-01 (through gears or the like). The rotor winding of the generator 104-01 is electrically connected to the converter 104-04. The stator of the generator 104-01 is electrically connected to the power system through a circuit breaker 104-06 and a coupling transformer 104-07. (Detailed configuration will be explained with reference to FIG. 2.)

The wind turbine controller 104-03 inputs the wind speed detection value U, a reactive power command value Qref, and a rotating speed detection value. The wind turbine controller 104-03 is provided with a function to output a pitch angle command value Pchref to the blades 104-02 to control the blade angle, a function to calculate an active power command value Pref, a function to output an active power command value Pref to the converter controller 104-05, a function to receive the reactive power command value Qref, and a function to transmit the received reactive power command value Qref to the converter controller 104-05.

The reactive power command value Qref, the active power command value Pref, and other command values are transmitted to the converter controller 104-05.

The converter controller 104-05 controls the converter 104-04 according to a command value and controls the power of the generator 104-01 and the power (active power and reactive power) to be outputted to the power system.

Figure 2:
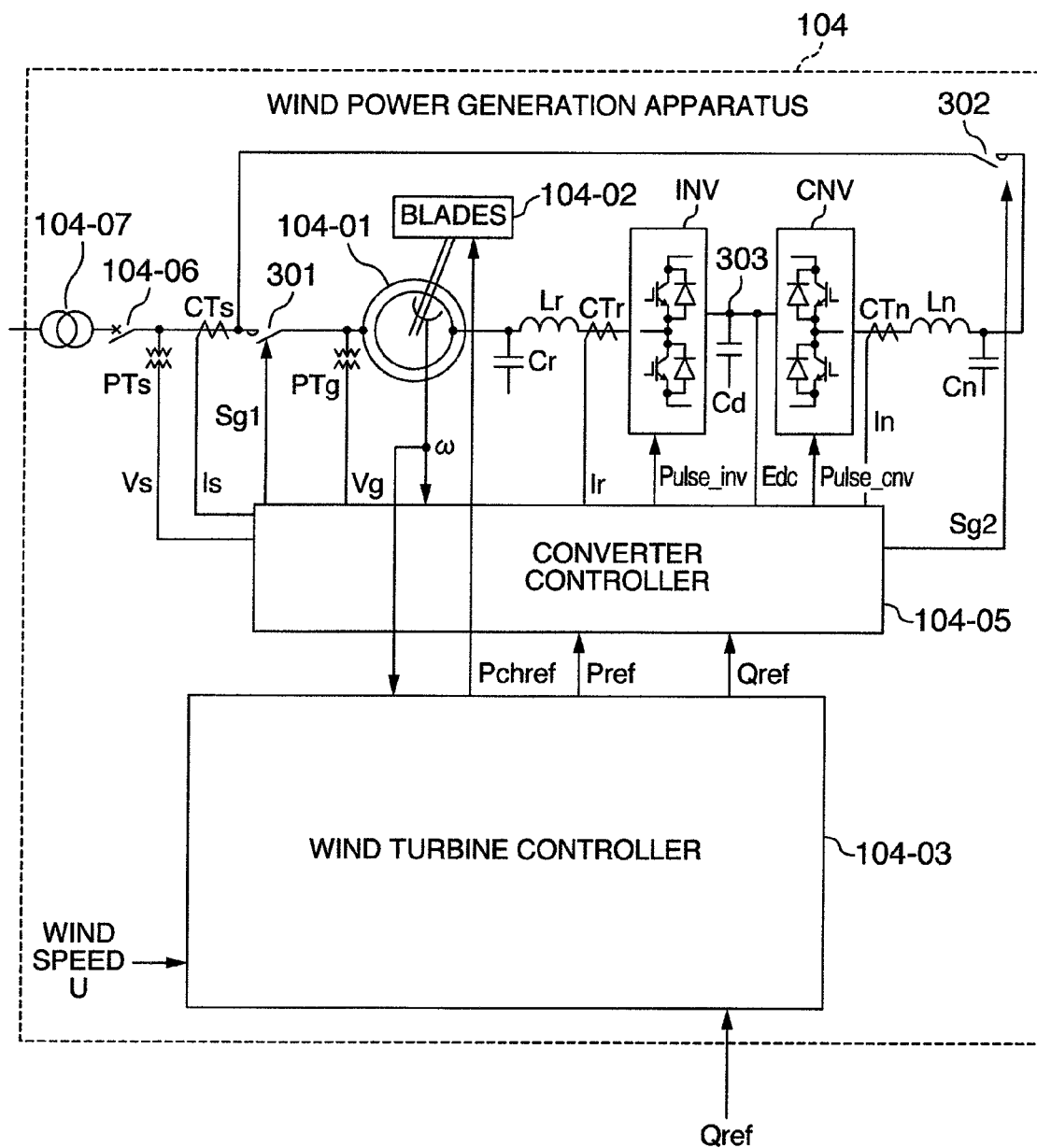
FIG. 2 is a diagram showing a configuration of a wind power generation apparatus.

The wind power generation apparatus 104 will be explained in detail below with reference to FIG. 2. FIG. 2 shows a configuration using an AC excited synchronous generator as a generator 104-01.

A three phase output on the side of the stator of the generator 104-01 is connected to, for example, the secondary side of an electromagnetic contactor 301 which can be opened and closed by an external signal Sg1. The primary side of the electromagnetic contactor 301 is connected to the primary side of an electromagnetic contactor 302. The secondary side of the electromagnetic contactor 302 is connected to a converter CNV through an AC filter circuit constituted by a capacitor Cn and a reactor Ln.

A DC circuit 303 of the converter CNV is connected to a DC circuit of a converter INV. The AC output of the converter INV is electrically connected to the rotor winding of the generator 104-01 through the AC filter circuit constituted by a capacitor Cr and a reactor Lr. The primary side of the electromagnetic contactor 301 is also connected to a power system 101 through the circuit breaker 104-06 and transformer 104-07.

The circuit breaker 104-06 is provided with a function to electrically disconnect the wind power generation apparatus 104 from the power system.

The converter INV on the generator side and the converter CNV on the power system side include semiconductor switching elements (thyristor, GTO, IGBT, MOS, SiC, etc.) as active switches, each being provided with a function to convert an alternating current into a direct current or vice versa.

The AC filter circuit constituted by a capacitor Cn and a reactor Ln installed at the AC output terminal of the converter CNV on the power system side is provided with a function to attenuate a harmonic current and a harmonic voltage.

The rotor of the generator 104-01, to which blades for wind power generation are connected through gears or the like, is rotated by a wind force. A speed detector for detecting a rotating speed, which is constituted by, for example, an encoder, is connected to the rotor to output a speed detection value ω to the converter controller 104-05 and a wind turbine controller 104-03.

With respect to the blades 104-02 connected to the rotor, the blade angle changes according to a pitch angle command value Pchref. If the incident direction of wind is defined as 0 degrees, the area to receive wind increases with increasing blade angle.

Wiring and an apparatus used to control the generation power will be explained below. A three phase voltage value and a three phase current value on the secondary side of the circuit breaker 104-06 are converted into a low-voltage voltage detection signal Vs and a low-voltage current detection signal Is by a voltage sensor PTs and a current sensor CTs, respectively. The low-voltage signals Vs and Is are input to the converter controller 104-05.

The voltage value of the secondary side (between the electromagnetic contactor 301 and the stator of the generator 104-01) is converted into a low-voltage voltage signal Vg by a voltage sensor PTg and then input to the converter controller 104-05.

The voltage of a capacitor Cd connected to a DC circuit 303 of the converter INV and converter CNV is converted to a low-voltage DC voltage signal Edc by the voltage sensor. The DC voltage signal Edc is input to the converter controller 104-05.

An output current Ir of the converter INV (secondary side current of the generator 104-01) is detected by a current sensor CTr, an output current In of the converter CNV is detected by a current sensor CTn, and the current detection values Ir and In are transmitted to the converter controller 104-05.

The wind turbine controller 104-03 is provided with a function to transmit an active power command value Pref, a reactive power command value Qref, and other command values to the converter controller 104-05; a function to calculate an active power command value Pref by inputting the wind speed U and an angular speed ω; a function to transmit the reactive power command value Qref; a function to calculate a pitch angle (blade angle) command value Pchref; and a function to transmit the calculated pitch angle command value to the blades 104-02.

The converter controller 104-05 controls the electromagnetic contactors 301 and 302 based on signals Sg1 and Sg2, respectively. The converter controller 104-05 outputs pulse signals Pulse_inv and Pulse_cnv used to drive and control the converter INV and converter CNV, respectively, which are constituted by semiconductor switching elements.

When a signal to turn on the electromagnetic contactor 302 is commanded by a signal Sg2 on an operation command basis and then the electromagnetic contactor 302 turns on, the converter CNV starts its operation based on the pulse signal Pulse_cnv to control the DC voltage Edc of a smoothing capacitor Cd to a constant level.

Figure 3:
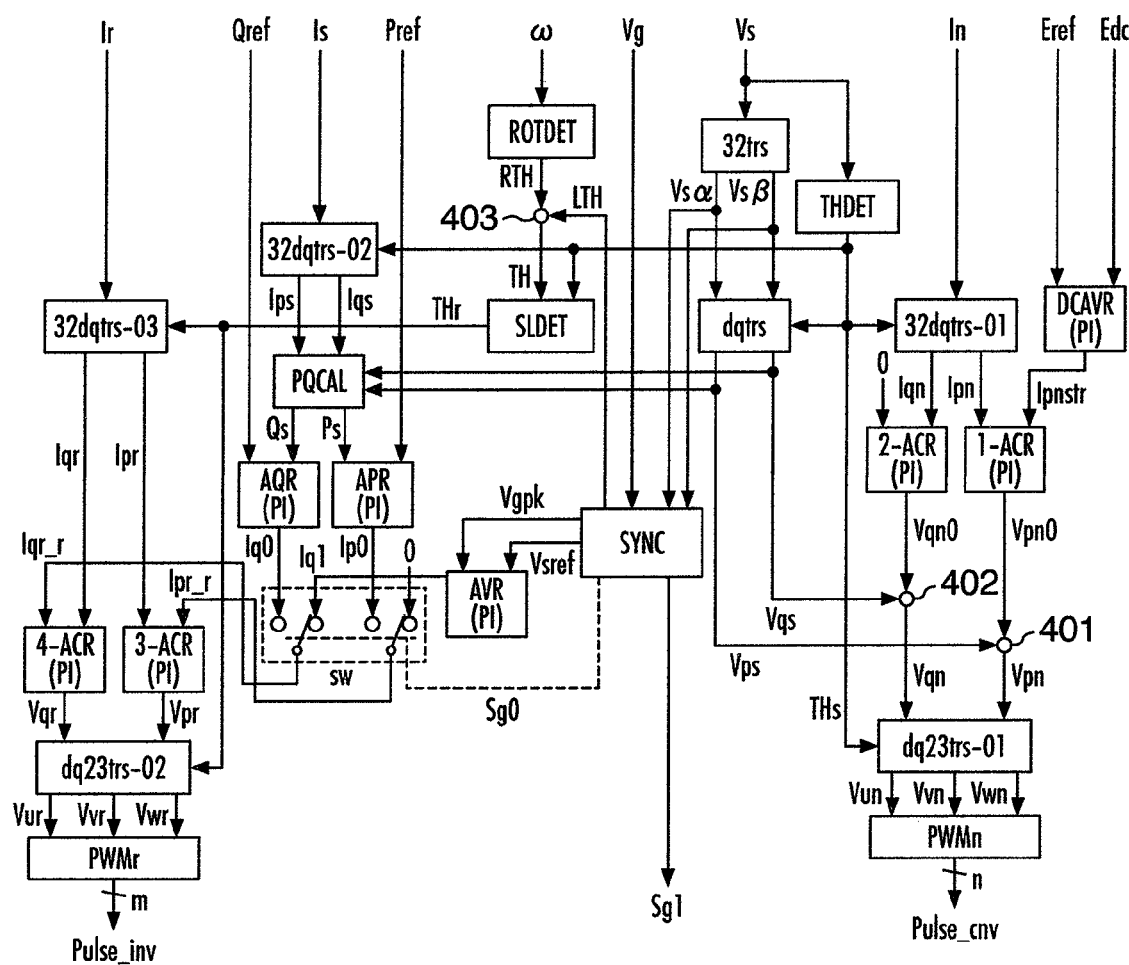
FIG. 3 is a diagram showing a configuration of converter control.

Functions of the converter controller 104-05 will be explained below with reference to FIG. 3.

First, control of the converter CNV will be explained in detail below. Before the converter CNV starts its operation, a command Sg2 to turn on the electromagnetic contactor 302 is output and the converter CNV is connected to the power system.

The AC detection value Vs is input to a phase detector THDET and a three-to-two phase transformer 32trs. The phase detector THDET calculates a phase signal THs following the voltage of the power system through, for example, the phase lock loop (PLL) method, and then outputs the phase signal THs (phase signal when the system U-phase voltage is a sine wave) to three-to-two phase coordinate transformers 32dqtrs-01 and 32dqtrs-02, a rotational coordinate transformer dqtr, an excitation phase calculating unit SLDET, and a two-to-three phase coordinate transformer dq23trs-01. A DC voltage command value Eref and the DC voltage detection value Edc are input to a DC voltage regulator DCAVR (constituted by, for example, a proportional-integral controller). The DC voltage regulator DCAVR regulates a p-axis current command value (active current command value) Ipnstr of output so that the deviation of the detection value Edc from the inputted command value Eref becomes zero, and then outputs the p-axis current command value Ipnstr to a current regulator 1-ACR.

The three-to-two phase coordinate transformer 32dqtrs-01 calculates, from an inputted current In, a p-axis current detection value Ipn (active current) and a q-axis current detection value Iqn (reactive current) using conversion equations shown as the following equations (1) and (2), and then outputs the p-axis current detection value Ipn and the q-axis current detection value Iqn to the current regulator 1-ACR and the current regulator 2-ACR, respectively.

Where, subscripts u, v, and w denote respective phases. For example, the U-phase current of In is denoted as Inu. This also applies to voltages, etc. hereafter.

$$\begin{pmatrix} In\alpha \\ In\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} In_u \\ In_v \\ In_w \end{pmatrix} \quad (1)$$

$$\begin{pmatrix} Ipn \\ Iqn \end{pmatrix} = \begin{pmatrix} \sin(THs) & -\cos(THs) \\ \cos(THs) & \sin(THs) \end{pmatrix} \begin{pmatrix} In\alpha \\ In\beta \end{pmatrix} \quad (2)$$

The current regulator 1-ACR regulates a p-axis voltage command value Vpn0 which is to be output so that the deviation of the p-axis current detection value Ipn from the p-axis current command value Ipnstr becomes zero, and then outputs the p-axis voltage command value Vpn0 to an adder 401.

Similarly, the current regulator 2-ACR regulates a q-axis voltage command value Vqn0 which is to be output so that the deviation of the q-axis current detection value Iqn from the q-axis current command value (=0) becomes zero, and then outputs the q-axis voltage command value Vqn0 to an adder 402. The current regulators (1-ACR and 2-ACR) can be configured with, for example, a proportional-integral controller.

The three-to-two phase transformer 32trs calculates an α-component Vsα and a β-component Vsβ from an inputted voltage Vs using a conversion equation shown as equation (3), further calculates a p-axis voltage detection value Vps (phase component which agrees with a system voltage vector) and a q-axis voltage detection value Vqs (component which perpendicularly intersects with the p-axis voltage detection value Vps) using equation (4), and outputs these values to the adders 401 and 402, respectively.

$$\begin{pmatrix} Vs\alpha \\ Vs\beta \end{pmatrix} = \frac{2}{3} \begin{pmatrix} \cos(0) & \cos(2\pi/3) & \cos(4\pi/3) \\ \sin(0) & \sin(2\pi/3) & \sin(4\pi/3) \end{pmatrix} \begin{pmatrix} Vs_u \\ Vs_v \\ Vs_w \end{pmatrix} \quad (3)$$

$$\begin{pmatrix} Vps \\ Vqs \end{pmatrix} = \begin{pmatrix} \sin(THs) & -\cos(THs) \\ \cos(THs) & \sin(THs) \end{pmatrix} \begin{pmatrix} Vs\alpha \\ Vs\beta \end{pmatrix} \quad (4)$$

The adder 401 adds the p-axis voltage command value Vpn0 and the p-axis voltage detection value Vps and then outputs the result to the two-to-three phase coordinate transformer dq23trs-01, Similarly, the adder 402 adds the q-axis voltage command value Vqn0 and the q-axis voltage detection value Vqs and then outputs the result to the two-to-three phase coordinate transformer dq23trs-01.

The two-to-three phase coordinate transformer dq23trs-01 inputs the phase signal THs and the results Vpn and Vqn of the adders, calculates voltage command values Vun, Vvn, and Vwn output by the converter CNV using conversion equations shown as the following equations (5) and (6), and outputs them to a PWM calculating unit PWMn.

$$\begin{pmatrix} Va \\ Vb \end{pmatrix} = \begin{pmatrix} \sin(THs) & \cos(THs) \\ -\cos(THs) & \sin(THs) \end{pmatrix} \begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The PWM calculating unit PWMn calculates a pulse signal Pulse_cnv, which turns on or off n semiconductor elements configuring the power converter CNV through a pulse-width modulation method, from inputted voltage commands Vun, Vvn, and Vwn, and then outputs the pulse signal to the converter CNV.

Control of the converter INV will be explained below.

An angular speed ω of the generator 104-01 is input to a rotational phase detector ROTDET. The rotational phase detector ROTDET converts the angular speed ω to a phase signal and then outputs a phase signal RTH to an adder 403.

The phase signal RTH and an output phase signal LTH of a synchronization controller SYNC are added by the adder 403 to form a phase signal TH. The phase signal TH is input to the excitation phase calculating unit SLDET together with the phase signal THs.

The excitation phase calculating unit SLDET subtracts the phase signals TH and THs, multiplies pairs of poles of the generator by k, and outputs the phase signal THr (=k(THs−TH)) of the electrical angular frequency of the rotor of the generator to a three-to-two phase coordinate transformer 32dqtrs-03 and a two-to-three phase coordinate transformer dq23trs-02.

A power calculating unit PQCAL converts a system current Is through conversion matrices shown as equation (1) and equation (2) described above; inputs an obtained p-axis current Ips (with the same direction as the U-phase vector of the power system voltage), a q-axis current perpendicularly intersecting with the U-phase vector of the power system voltage, the above-mentioned p-axis voltage detection value Vps, and a q-axis voltage detection value Vqs; and calculates active power Ps and reactive power Qs of the system based on the following equation (7).

$$Ps=3(Vps\times Ipx+Vqs\times Iqs)/2$$

$$Qs=3(-Vps\times Iqs+Vqs\times Ips)/2 \quad (7)$$

An active power regulator APR inputs the active power Ps and active power command value Pref of the wind power generation apparatus, and then outputs an active current command value Ip0 so that the deviation of the active power detection value Ps from the active power command value Pref becomes zero.

A reactive power regulator AQR inputs the reactive power Qs and reactive power command value Qref, and then outputs an active current command value Iq0 so that the deviation of the reactive power detection value Qs from the reactive power command value Qref becomes zero.

The active power regulator APR and the reactive power regulator AQR can be configured with, for example, a proportional-integral controller.

The current command value Ip0 output by the active power regulator APR and the current command value Iq0 output by the reactive power regulator are input to a selector SW.

The selector SW determines whether the current command values (Ip0 and Iq0) outputted by the active power regulator APR and reactive power regulator AQR, or zero for the active current command value and an output Iq1 of the voltage regulator AVR for the excitation current command value are used. The selector SW uses the latter (uses zero for the active current command value and output of the voltage regulator for the excitation current command value) before the electromagnetic contactor 301 is turned on (that is, during voltage-synchronization operation for synchronizing the stator voltage Vg of the generator 104-01 with the power system voltage Vs) and selects the former (uses output values of each power regulator) after the electromagnetic contactor 301 is turned on.

The synchronization controller SYNC calculates an amplitude command value Vsref obtained through a filter for an amplitude value of an instantaneous vector of the above-mentioned system voltage detection value Vs, and similarly calculates an amplitude detection value Vgpk obtained through a filter for an amplitude value of an instantaneous vector from the above-mentioned stator voltage detection value Vg of the generator. The synchronization controller SYNC is provided with a function to determine whether the amplitude command value Vsref is in synchronization with the voltage amplitude Vgpk of the generator; a function to output the phase correction signal LTH for correcting the difference between the phase of the power system voltage and that of the stator voltage; a function to determine whether the phases of the power system voltage and stator voltage are within a predetermined range and in synchronization with each other; and a function to output the operation signal Sg1 and control selector signal Sg0 of the circuit breaker.

The voltage regulator AVR will be explained below. The voltage regulator AVR uses the amplitude value Vgpk of the stator voltage Vg of the generator as a feedback value, inputs the amplitude command value Vsref, obtained through a filter for the amplitude value of the power system voltage Vs, as a command value, and outputs the excitation current command value Iq1 so that the deviation of the amplitude value Vgpk from the amplitude command value Vsref becomes zero. The voltage regulator AVR can be configured with, for example, a proportional-integral controller. The voltage regulator AVR, operated with the electromagnetic contactor 301 opened, regulates an excitation current command value Iqr_r for making a current flow on the secondary side of the generator 104-01 from the converter INV in order to match the amplitude value of the stator voltage of the generator 104-01 with the amplitude value of the power system voltage.

The operation of the synchronization controller SYNC, the voltage regulator AVR, and the selector SW in this manner makes it possible to synchronize the stator voltage Vg with the power system voltage before the generator 104-01 is connected to the power system, and immediately select power control after the connection of the generator to the power system.

The configuration of a current control section which controls a current of the stator of the generator according to a current command value will be explained below. The three-to-two phase coordinate transformer 32dqtrs-03 calculates a q-axis current detection value Iqr (excitation current component) and a p-axis current detection value Ipr (active current component) and then outputs the q-axis current detection value Iqr to a current regulator 4-ACR and the p-axis current detection value Ipr to a current regulator 3-ACR by using the following conversion equations (8) and (9).

$$\begin{pmatrix} Ir\alpha \\ Ir\beta \end{pmatrix} = \frac{2}{3}\begin{pmatrix} \cos(0) & \cos(2\pi/3) & \cos(4\pi/3) \\ \sin(0) & \sin(2\pi/3) & \sin(4\pi/3) \end{pmatrix}\begin{pmatrix} Ir_u \\ Ir_v \\ Ir_w \end{pmatrix} \quad (8)$$

$$\begin{pmatrix} Ipr \\ Iqr \end{pmatrix} = \begin{pmatrix} \sin(THr) & -\cos(THr) \\ \cos(THr) & \sin(THr) \end{pmatrix}\begin{pmatrix} Ir\alpha \\ Ir\beta \end{pmatrix} \quad (9)$$

The current regulator 4-ACR regulates a q-axis voltage command value Vqr which is to be output so that the deviation of the q-axis current detection value Iqr from the q-axis current command value Iq1 or Iq0 becomes zero. Similarly, the current regulator 3-ACR regulates a p-axis voltage command value Vpr which is to be output so that the deviation of the p-axis current detection value Ipr from the p-axis current command value Ip1 (=0) or Ip0 becomes zero. Each voltage regulator can be configured with, for example, a proportional-integral controller.

The p-axis voltage command value Vpr and q-axis voltage detection value Vqr are input to a two-to-three phase coordinate transformer dq23trs-02, The two-to-three phase coordinate transformer dq23trs-02 calculates voltage command values Vur, Vvr, and Vwr (to be output by the two-to-three phase coordinate transformer dq23trs-02) from the phase signal THr and each input value described above, based on the following conversion equations (10) and (11), and then outputs the voltage command values to the PWM calculating unit PWMr.

$$\begin{pmatrix} Va \\ Vb \end{pmatrix} = \begin{pmatrix} \sin(THr) & \cos(THr) \\ -\cos(THr) & \sin(THr) \end{pmatrix}\begin{pmatrix} Vpr \\ Vqr \end{pmatrix} \quad (10)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix}\begin{pmatrix} Va \\ Vb \end{pmatrix} \quad (11)$$

The PWM calculating unit PWMr calculates a pulse signal Pulse_inv, which turns on or off m semiconductor elements configuring the converter INV, from inputted voltage commands Vur, Vvr, and Vwr through the pulse-width modulation method, and then outputs the pulse signal to the converter INV.

The operation of the converter CNV configured in this manner will be explained in brief below. The converter controller detects the phase of the power system voltage Vs and exchanges active power between the converter CNV and the power system by controlling a current command value having the same phase as the detected voltage phase to control the DC voltage. When the converter INV on the generator side uses the power of the DC circuit 303, the energy of the smoothing capacitor Cd is consumed. If the DC voltage Ed decreases, for example, DC voltage control of the converter CNV on the power system side operates such that the smoothing capacitor Cd is charged using AC power to maintain a constant DC voltage Edc. If the DC voltage Edc rises when the converter INV charges DC power, DC voltage control of the converter CNV converts the DC power into AC power for discharge and then operates to maintain a constant DC voltage Edc.

Figure 4:
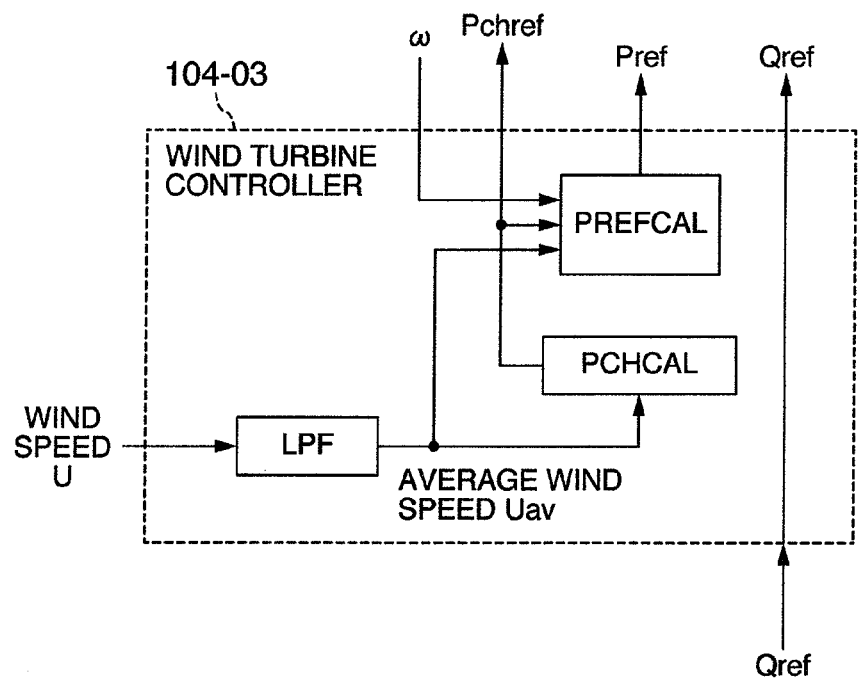
FIG. 4 is a diagram showing a configuration of wind turbine control.

The wind turbine controller 104-03 will be explained below with reference to FIGS. 4-6. In FIG. 4, the wind turbine controller 104-03 inputs wind speed U and then detects an average wind speed Uav using a first order lag filter LPF or the like. The detected average wind speed Uav is input to a pitch angle command calculating unit PCHCAL.

The pitch angle command calculating unit PCHCAL calculates a pitch angle command value Pchref using, for example, the average wind speed Uav and a pitch angle table. The pitch angle command value Pchref is transmitted to the blades 104-02 and a power command calculating unit PREFCAL.

Figure 5:
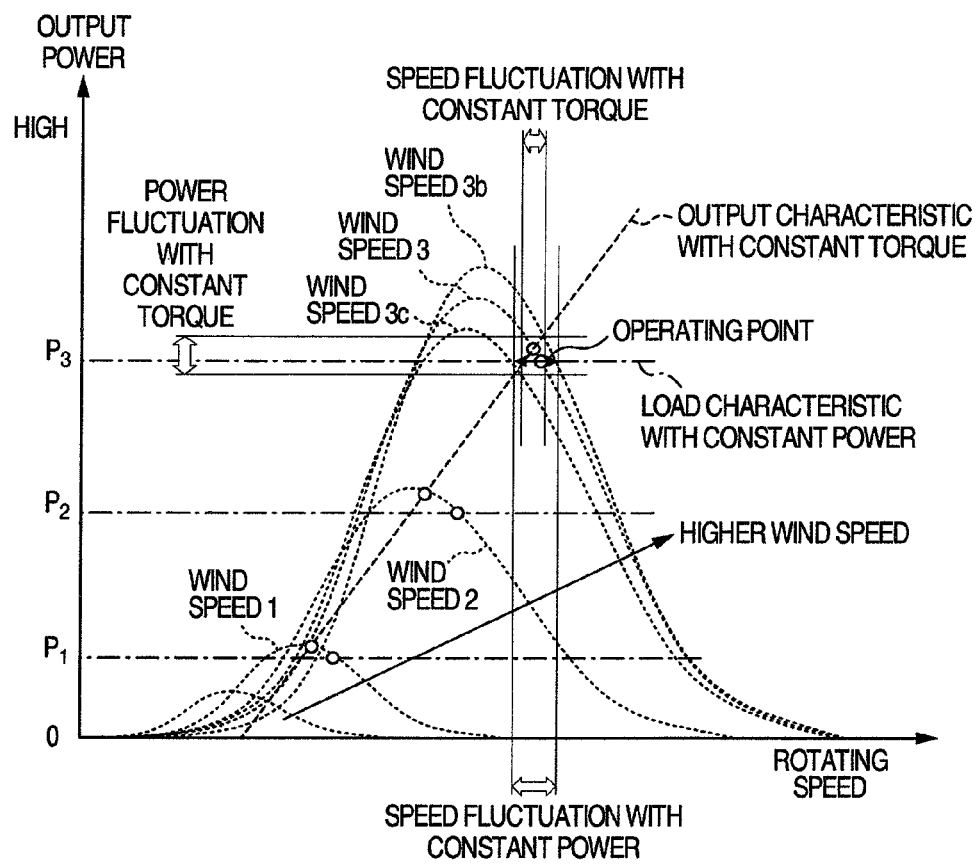
FIG. 5 is a diagram showing generator output characteristics relative to a rotating speed.

FIG. 5 shows output characteristics of the wind turbine relative to a rotating speed. When the wind speed changes as wind speed 1, wind speed 2, and wind speed 3, the output characteristics of the generator has a peak with respect to a certain pitch angle forming a convex curve. With wind speed 3 (when the wind speed is high), for example, when the power command value sets P3, the operating point converges to point A at which level P3 intersects with the right-hand side slope of the convex curve.

Then, even if wind speed 3 changes to wind speed 3*b* or 3*c* as the wind condition changes, the apparatus is operated at a point at which the output characteristic curve intersects with the power command value P3. In comparison with the conventional constant torque control method, the apparatus is operated following a constant power command value P3 although the speed fluctuates.

At low wind speeds, the pitch angle is controlled to a fixed value to receive the maximum amount of wind. Generation operation is performed at the speed of an operating point, determined by the output characteristic of the wind turbine, by changing the power command value. With high wind, the power command value is fixed to a maximum value enabling power generation under the relevant wind condition in order to fix the output power to the maximum value. This allows the rotating speed to be controlled to a predetermined value by changing the pitch angle and changing the output characteristic curve.

Therefore, the power command calculating unit PREFCAL includes, for example, the characteristic curve in FIG. 5 at each pitch angle as an internal reference table. The calculating unit is provided with a function to obtain an active power command value Pref from the pitch angle command value Pchref, average wind speed Uav, and angular speed ω.

If the wind speed decreases from wind speed 3 to wind speed 2, for example, the generation power exceeds that in the output characteristics of the generator, which results in speed reduction, and then the blades come to a stop. Control for rapidly decreasing the power command value is necessary in response to such rapid speed reduction. Therefore, the power command calculating unit PREFCAL is provided with a function to decrease the power command value if the speed change rate (speed reduction rate) dω/dt exceeds a predetermined value.

Figure 14:
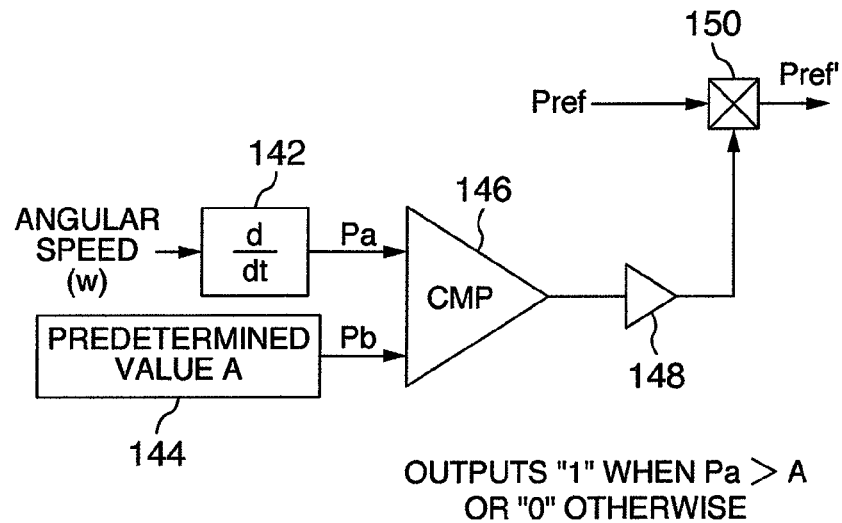
FIG. 14 is a diagram showing a circuit for decreasing a power command value.

FIG. 14 shows an example of a circuit having the function to decrease the active power command value Pref.

A change rate of the angular speed ω can be obtained by a differentiating unit 142 and this change rate Pa is input to a comparator 146. A predetermined value A is input to the comparator 146 through memory or other memorizing means 144. If the change rate Pa is greater than the predetermined value A, the comparator 146 outputs output value "1"; otherwise, it outputs "0." Then, the output value is amplified by an amplifier 148 by multiplying the output value by, for example, coefficient 0.5, The output value from the amplifier is multiplied by a multiplier in response to the active power command value Pref. As a result, an active power command value Pref of, for example, "100" is output as a power command value Pref of "50".

Therefore, the power command calculating unit PREFCAL is provided with both a function to decrease the power command value if the speed change rate dω/dt exceeds a predetermined value and a function to calculate a pitch angle command value determined by the average wind speed and a power command value determined by the angular speed ω.

The fluctuation of the output power will be explained below with reference to FIG. 5. If the average wind speed is stable at wind speed 3 and fluctuates in the vicinity, the output power is controlled to a constant level without fluctuation in response to the fluctuation of the rotating speed when power control is used when observed in a short period of time. In torque control, on the other hand, equation (12) clearly demonstrates that the output power fluctuates largely in response to the fluctuation of the rotating speed.

$$(\text{Power}) = (\text{Angular speed}) \times (\text{Torque}) \quad (12)$$

In torque control, the output power is regulated in response to the fluctuation of the wind speed. For example, if the speed drops when the wind speed slightly decreases, the power is reduced and speed reduction is also suppressed accordingly. In power control, on the other hand, even if the speed drops when the wind speed slightly decreases, for example, power output is continued until the power command value is reduced, resulting in larger speed reduction than in torque control. However, the fluctuation of the output power is suppressed and therefore the effect on the frequency of the power system is smaller than that in torque control.

If the wind speed slightly fluctuates in the vicinity of the average wind speed, power control is characterized by large fluctuation of the speed with small fluctuation of generation power while torque control is characterized by large small fluctuation of speed with fluctuation of generation power.

As mentioned above, stable operation of the variable speed wind power generation system is realized by calculating the pitch angle command value Pchref from the wind speed U and changing the active power command value Pref for power control using the pitch angle command value, angular speed ω, and wind speed Uav.

The use of power control makes it possible to suppress output fluctuation caused by wind speed fluctuation, resulting in a system having a small effect on the power system.

By providing a function to control the reactive power to be output to the power system based on the reactive power command value Qref and supplying the reactive power from the generation system, it is possible not only to regulate the power system voltage but also to omit installation of a synchronous phase modifier, electric power capacitor, etc.

Embodiment 2

Another embodiment will be explained below with reference to FIGS. 6-8. The same symbols are assigned to elements having the same function as those in Embodiment 1, and duplicated explanations are omitted. Embodiment 2 uses a different method for creating an active power command Pref from that in Embodiment 1.

Figure 6:
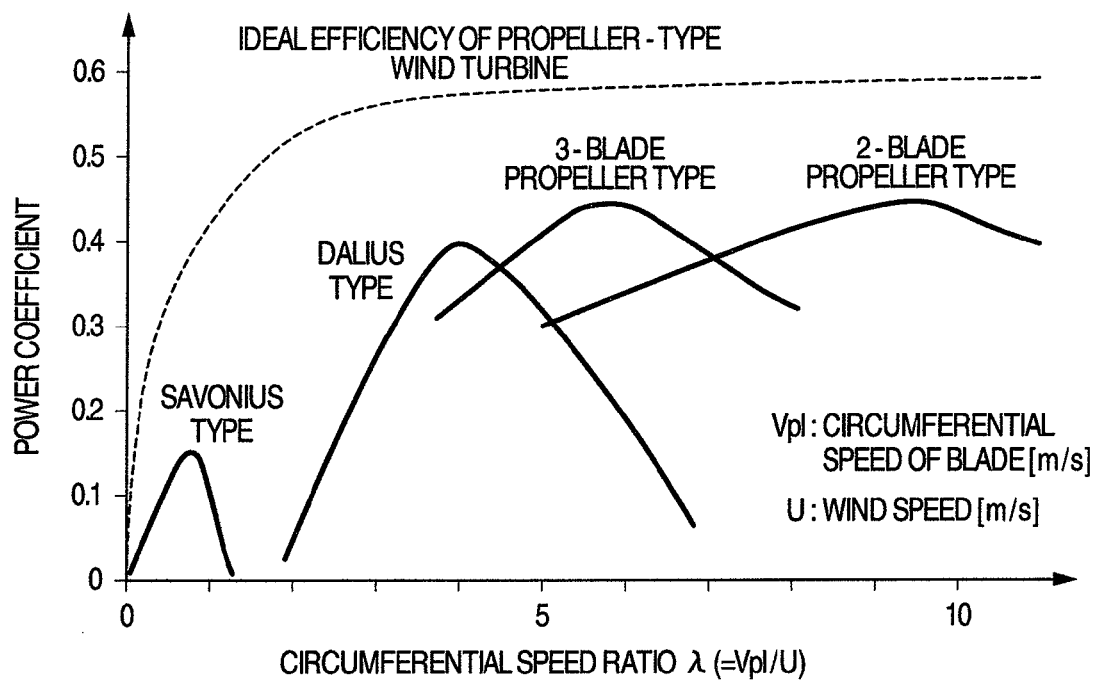
FIG. 6 is a diagram showing the efficiency of a wind turbine.
Figure 7:
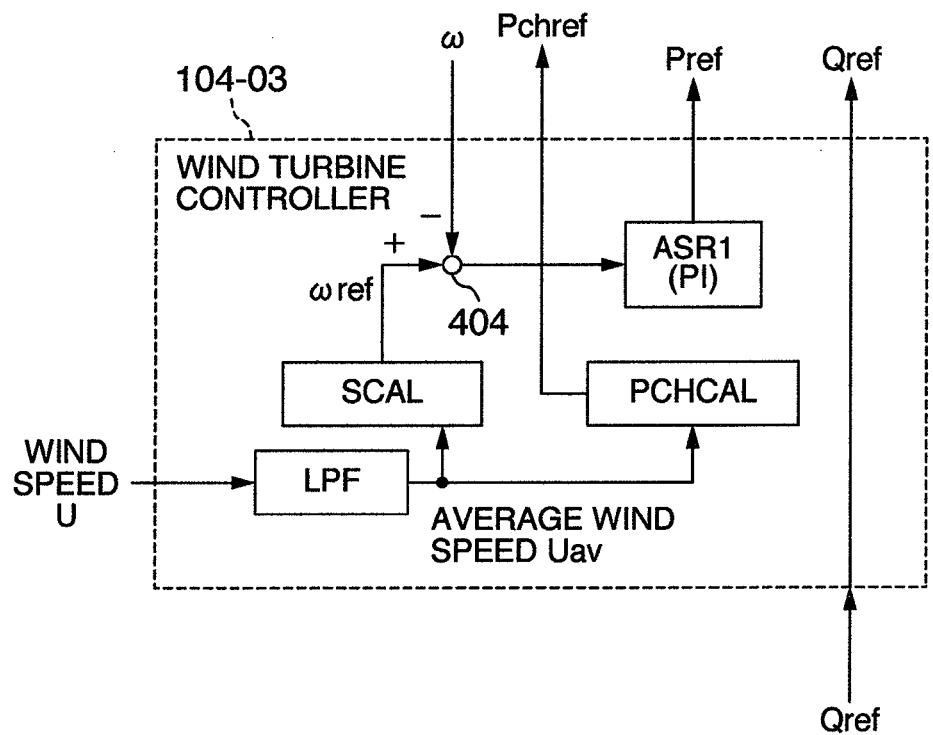
FIG. 7 is a diagram showing a configuration of another embodiment of wind turbine control.

FIG. 6 shows the efficiency with which the wind turbine produces energy from wind. The horizontal axis indicates the ratio of the circumferential speed Vp1 [m/s] of a blade (end) relative to the wind speed U [m/s] (circumferential speed ratio X=Vp1/U), and the vertical axis indicates the efficiency. As clearly shown in the FIG. 6, the efficiency is maximized at a certain circumferential speed ratio λ. The above-mentioned pitch angle table can be realized, for example, by obtaining in advance a pitch angle (at which rotating speed for a circumferential speed ratio with high efficiency can be obtained) from each wind speed value based on the characteristics in FIG. 7 and creating a table of pitch angle command value relative to wind speed as shown by the characteristic curve in FIG. 15.

The wind turbine controller 104-03 will be explained below with reference to FIG. 7. The wind turbine controller 104-03 inputs the wind speed U and detects an average wind speed Uav using a first order lag filter LPF or the like.

Figure 15:
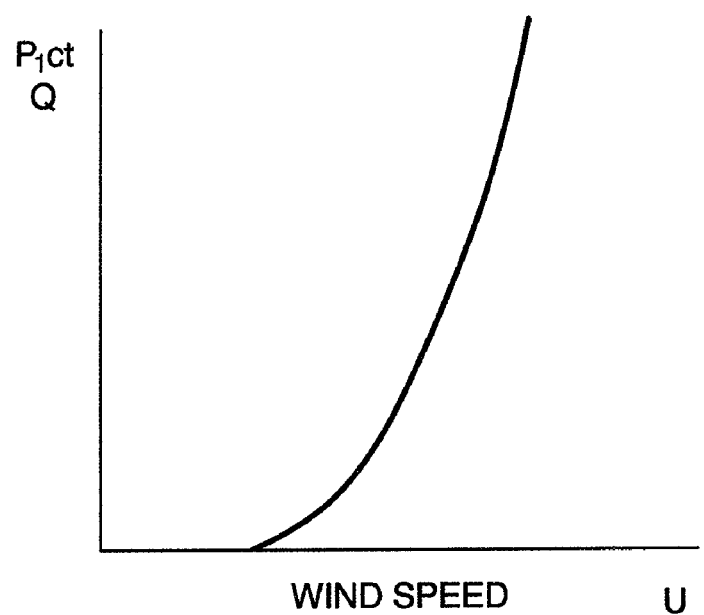
FIG. 15 is a graph showing a pitch angle command value relative to wind speed.

As shown by the characteristic curve in FIG. 15, the pitch angle command calculating unit PCHCAL calculates a pitch angle command value Pchref from the average wind speed Uav.

Figure 16:
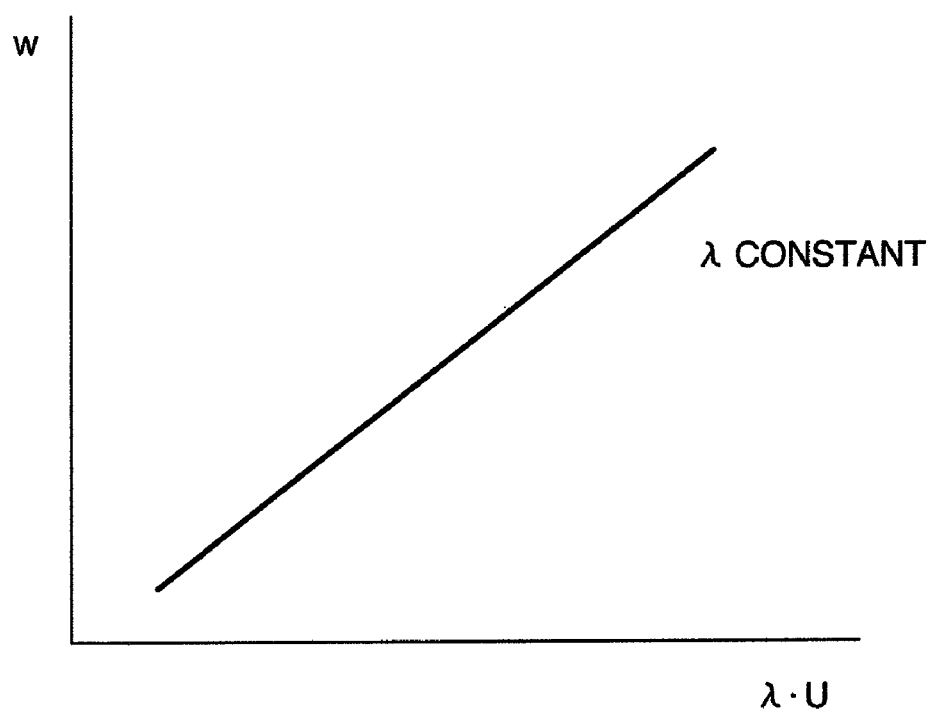
FIG. 16 is a graph showing an angular speed command value relative to a circumferential speed ratio and wind speed.

A speed command calculating unit SCAL obtains a circumferential speed by multiplying a circumferential speed ratio λ with high efficiency by the average wind speed Uav like the table data shown by the characteristic curve in FIG. 16 and calculates an angular speed command value ωref from the circumferential speed and blade diameter.

For the obtained angular speed command value ωref, the difference from the detected angular speed ω is calculated by a subtracter 404, and the obtained difference (ωref−ω)) is input to a speed regulator ASR1. The speed regulator ASR1 regulates the active power command value Pref so that the difference becomes zero and then transmits it to the converter controller 104-05. The speed regulator ASR1 is constituted, for example, by a proportional-integral controller. As shown in the above-mentioned embodiment, since it is necessary to rapidly reduce the power command value in response to rapid reduction of wind speed, the speed regulator ASR1 is provided with a function for this purpose.

Figure 8:
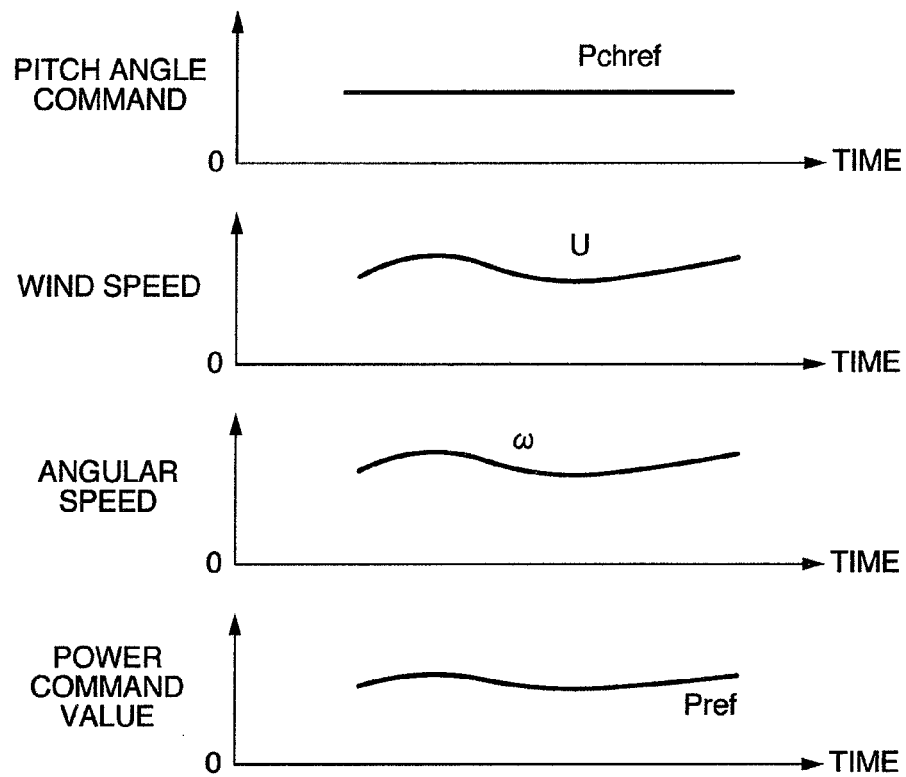
FIG. 8 is an operation diagram of a system according to the wind turbine control shown in FIG. 8.

FIG. 8 shows the fluctuation of each section value with time. Since speed control operates rapidly in response to the pitch angle command, the active power command value Pref changes more largely than the pitch angle command value Pchref in response to the fluctuation of the wind speed U to maintain a constant circumferential speed ratio.

As mentioned above, stable operation of the variable speed wind power generation system can be realized by calculating the pitch angle command value Pchref and the angular speed command value ωref and changing the active power command value Pref of power control to set a speed which suits the pitch angle command value.

Since the system can be operated at rotating speeds at which the circumferential speed ratio corresponds to high blade efficiency, high-efficiency operation can be realized.

Embodiment 3

Figure 9:
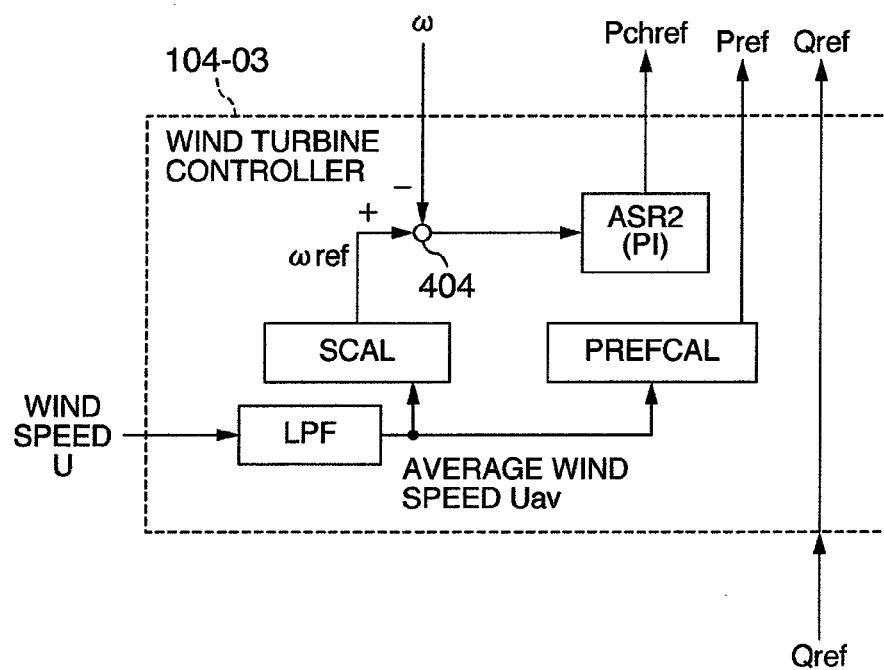
FIG. 9 is a diagram showing a configuration of still another embodiment of wind turbine control.

Still another embodiment will be explained below with reference to FIGS. 9 and 10. FIG. 9 shows another embodiment of the wind turbine controller shown in FIG. 7. The same symbols are assigned to elements having the same function as those in Embodiment 1, and duplicated explanations are omitted.

The wind turbine controller 104-03 will be explained below with reference to FIG. 9. The wind turbine controller 104-03 inputs the wind speed U and detects an average wind speed Uav using a first order lag filter LPF or the like. The detected average wind speed Uav is input to the speed command calculating unit SCAL and power command calculating unit PREFCAL.

The power command calculating unit PREFCAL calculates an active power command value Pref using, for example, a table of average wind speed Uav relative to output power. As shown in the above-mentioned embodiment in FIG. 5, the power command calculating unit PREFCAL can be realized by obtaining in advance a table of power command value when the wind turbine corresponds to a circumferential speed ratio with high efficiency and creating a table of power command value relative to wind speed. Stable operation can be realized even under a transient condition by providing a function to rapidly reduce the power command value in response to rapid reduction of wind speed as shown in the above-mentioned embodiment and a function to maintain a small power command value during pitch angle adjustment in the power command calculating unit.

The speed command calculating unit SCAL obtains a circumferential speed by multiplying a circumferential speed ratio with high efficiency by the wind speed as shown in the above-mentioned embodiment and calculates an angular speed command value ωref from the blade diameter.

For the obtained angular speed command value ωref, the difference from the detected angular speed ω is calculated by a subtracter and then the obtained difference (ωref−ω) is input to a speed regulator ASR2. The speed regulator ASR2 regulates the pitch angle command value Pchref so that the difference becomes zero and then transmits it to the blades 104-02. The speed regulator ASR2 is constituted, for example, by a proportional-integral controller.

If the maximum value of the active power command value Pref is changed to a predetermined value firstly and then the pitch angle by pitch angle control is changed to a predetermined value secondly, the generation power becomes larger than the input energy obtained from the blades, resulting in reduced speed. To avoid this, it is necessary to set a small power command value until the pitch angle reaches a predetermined value or set a small power command value using a low-pass filter LPF or the like until the pitch angle reaches a predetermined value and the rotating speed reaches a target value. This can realize stable operation under a transient condition.

Figure 10:
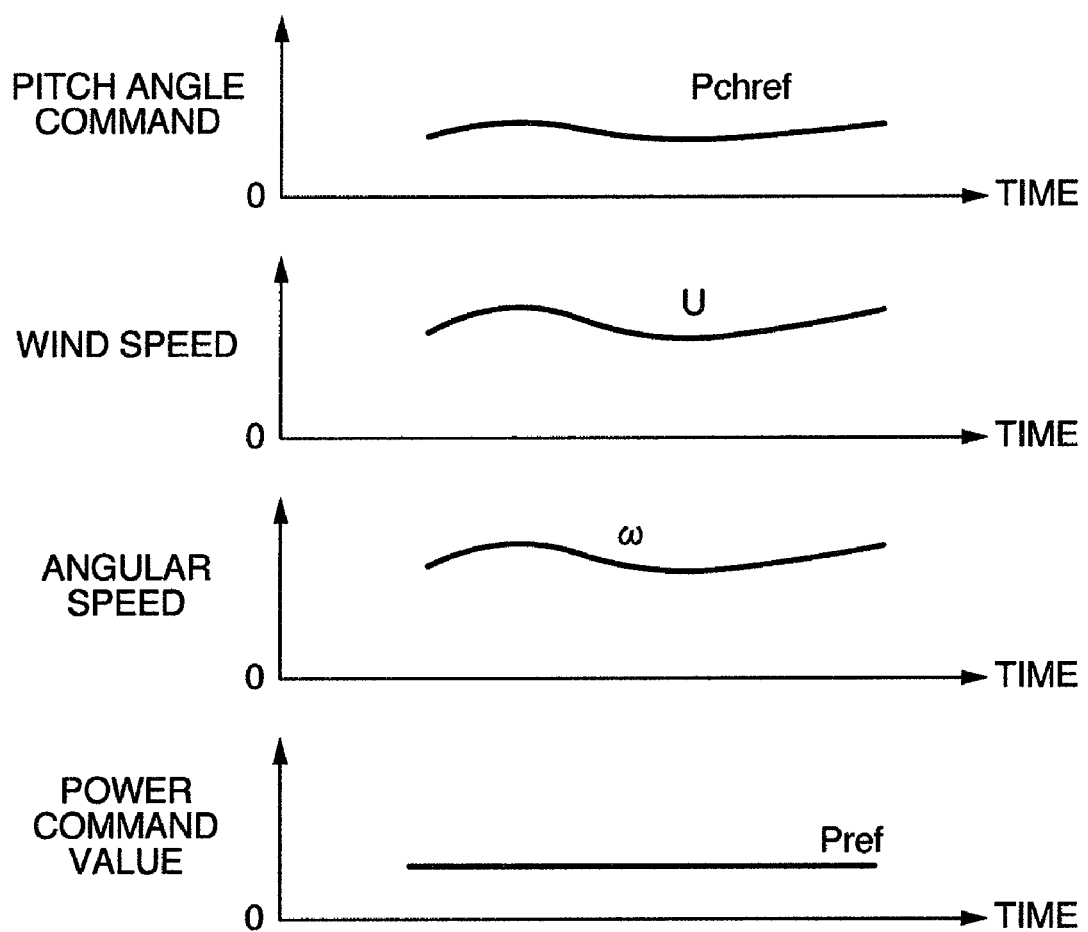
FIG. 10 is an operation diagram of a system according to the wind turbine control shown in FIG. 9.

FIG. 10 shows a fluctuation of each section value with time. Since speed control by the pitch angle changed is operated rapidly in response to changed speed of the active power command Pchref, the pitch angle command value Pchref changes more largely than the active power command value Pref in response to the fluctuation of the wind speed U to maintain a constant circumferential speed ratio.

As mentioned above, stable operation of the variable speed wind power generation system can be realized by calculating the active power command value Pref and the angular speed command value ωref and changing the pitch angle command value Pchref to set a speed which suits the active power command value Pref.

The use of power control makes it possible to suppress output fluctuation caused by wind speed fluctuation, resulting in a system having a small effect on the frequency of the power system.

Embodiment 4

Still another embodiment will be explained below with reference to FIGS. 9 and 10. FIG. 9 shows another embodiment of the wind turbine controller shown in FIG. 7. The same symbols are assigned to elements having the same function as those in Embodiment 1, and duplicated explanations are omitted.

Figure 17:
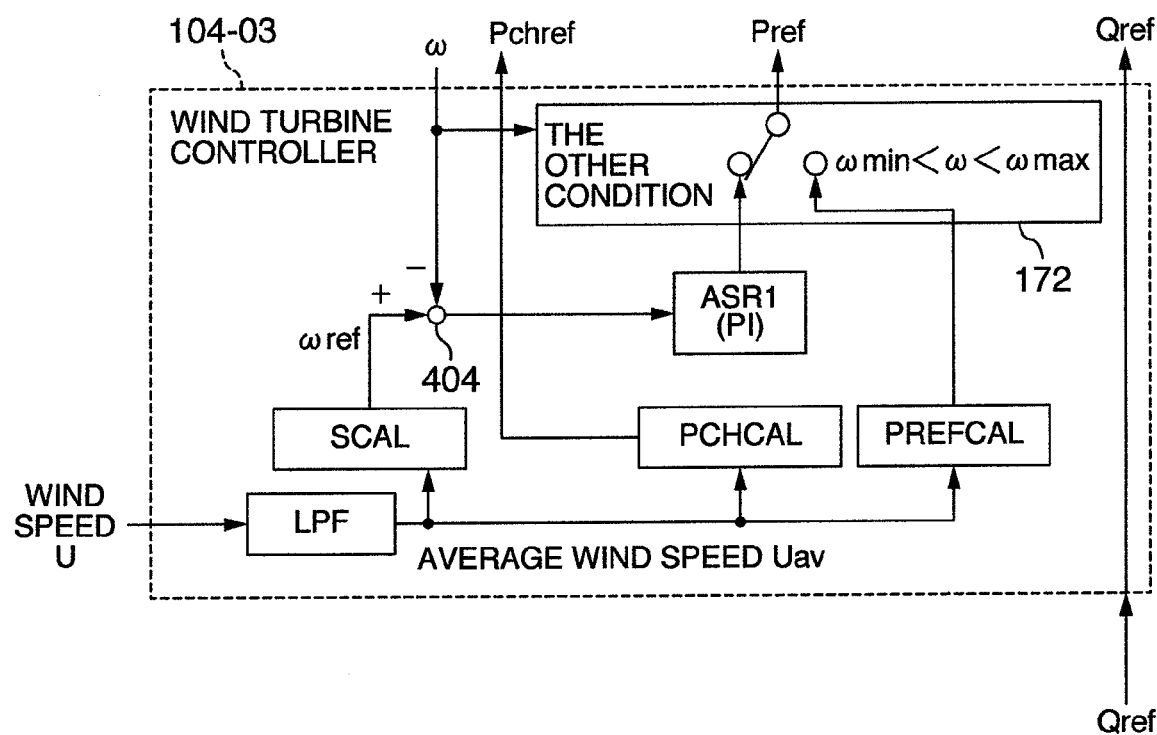
FIG. 17 is a diagram showing a configuration of still another embodiment of wind turbine control.

FIG. 17 shows the wind turbine controller 104-03 having a function to select a power command value Pref according to the condition of the angular speed ω.

The active power command value Pref is input to a power command selector 172 from the power command calculating unit PREFCAL. The active power command value Pref is input to the power command selector 172 also from the speed regulator ASR1 which input the angular speed ω.

If the inputted angular speed ω is within a range between ωmin and ωmax (ωmin<angular speed ω<ωmax), the active power command value Pref from the power command calculating unit PREFCAL is output from the power command selector 172; otherwise, the active power command value Pref from the speed regulator ASR1 is output from the power command selector 172.

According to the configuration of Embodiment 4, if the inputted angular speed ω is within a predetermined angular speed range, i.e., an angular speed range which suits power-priority control (ωmin<Angular speed ω<ωmax), the system is controlled based on the power-priority control and it can stably respond to a power output request inputted from outside. If the inputted angular speed is out of this range, the system is controlled based on angular-speed-priority control and it shifts to an efficient stable rotating condition.

Embodiment 5

Figure 11:
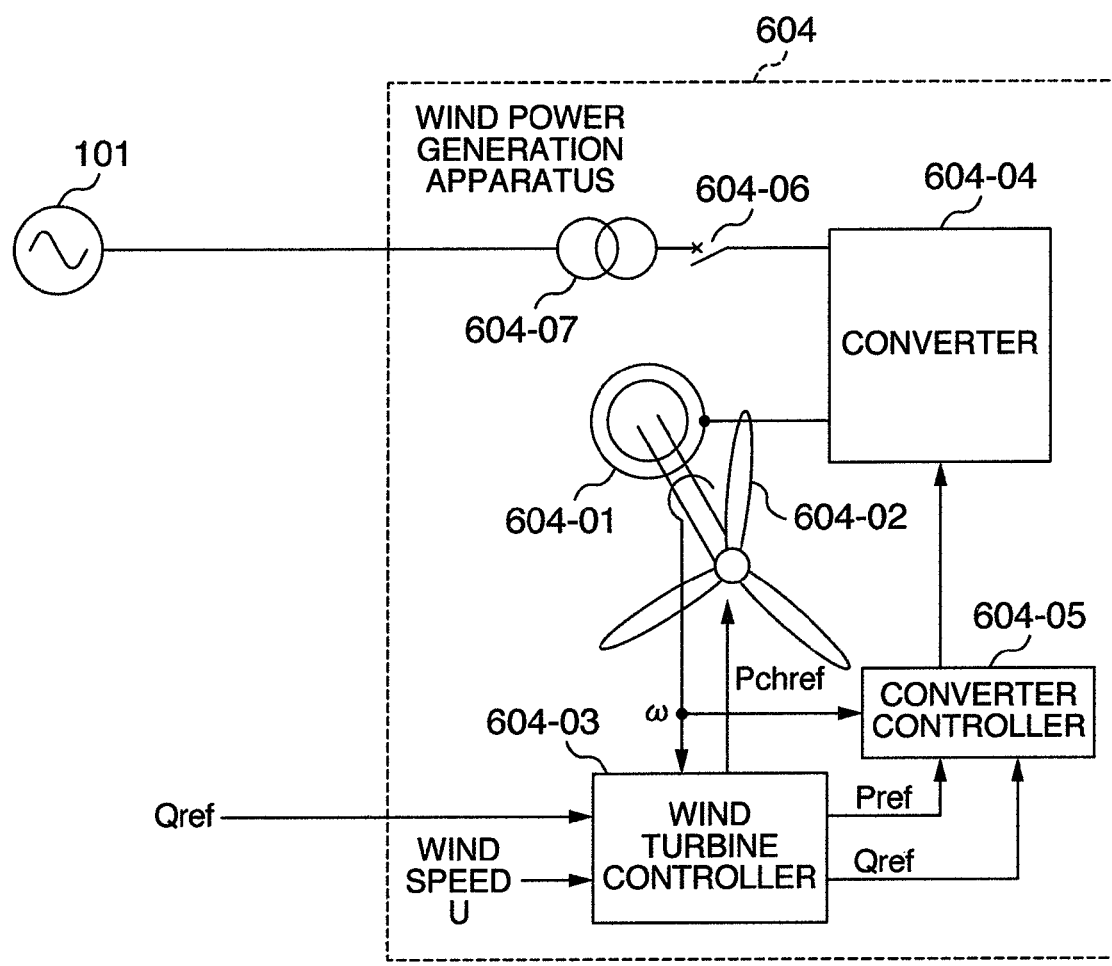
FIG. 11 is a diagram showing a configuration of a wind power generation apparatus according to another embodiment.
Figure 12:
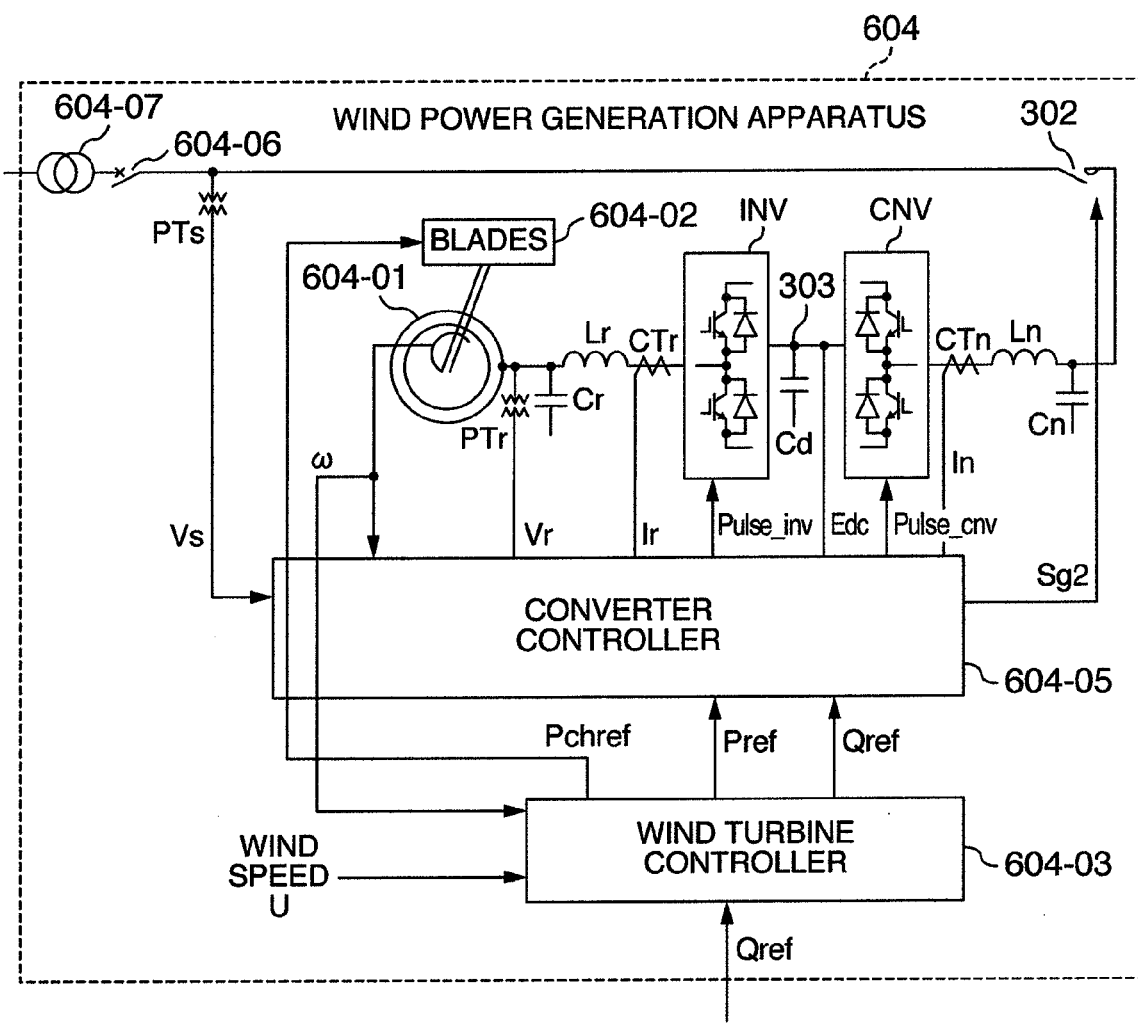
FIG. 12 is a diagram showing a configuration of a wind power generation apparatus.

In Embodiment 1, the wind power generation apparatus has been explained in which a wound-rotor induction generator is connected to a power system using a converter. This can also be applied to the case when the synchronous generators as shown in FIG. 11 and FIG. 12 are used.

In Embodiment 5, a synchronous generator 604-01 with permanent magnets, for example, is used as a generator and the power produced from the generator is output to a power system 101 through AC-DC-AC conversion by a converter 604-04.

Functions of the converter controller 604-05 will be explained with reference to FIG. 12.

The same symbols are assigned to elements having the same function as those in Embodiment 1.

Control of the converter CNV will be explained first.

Control of the above-mentioned converter controller 104-05 differs from control of the converter CNV on the power system side in that, with the converter controller 604-05, the command value inputted to a reactive current regulator 2-ACR is an output current command value Iqnstr (reactive current command value) of a reactive power regulator AQR2.

Active power and reactive power Qn outputted by a power calculating unit PQCAL2 can be calculated from a system voltage Vs and output current In. The reactive power Qn is inputted to the reactive power regulator AQR2 as a feedback value to change the reactive current Iqn to match it with the reactive power command value Qref.

Figure 13:
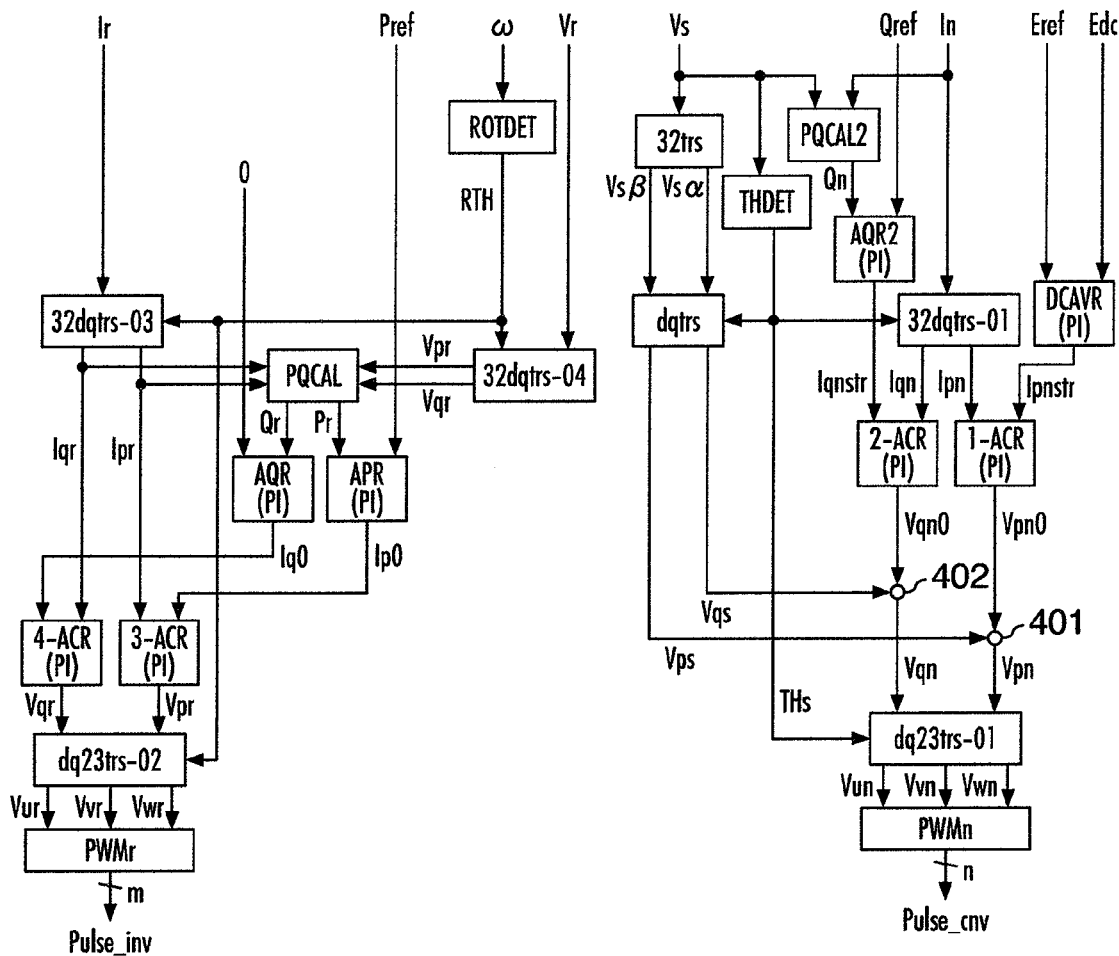
FIG. 13 is a diagram showing a configuration of converter control.

Control of the converter INV will be explained with reference to FIG. 13.

The angular speed ω of the synchronous generator 604-01 is input to a rotational phase detector ROTDET. A large difference from the controller 104-05 shown in FIG. 3 is that a rotational phase RTH is used as a phase signal as it is with the phase detection method of the synchronous generator 604-01.

A power calculating unit PQCAL converts Ir of the generator through conversion matrices shown as above-mentioned equation (1) and equation (2), inputs an obtained p-axis current Ipr (with the same direction as the U-phase vector of the generator voltage), a q-axis current Iqr perpendicularly intersecting with the U-phase vector of the power system voltage, and a d-axis voltage Vdr and q-axis Vqr obtained by converting the generator voltage Vr using the same conversion matrices shown as equation (3) and equation (4); and calculates active power Pr and reactive power Qr of the generator in the same manner as equation (7).

An active power regulator APR inputs the active power Ps and the active power command value Pref outputted by the wind power generation apparatus and then outputs an active current command value Ip0 so that the deviation of the above-mentioned active power detection value Pr from the above-mentioned active power command value Pref becomes zero.

A reactive power regulator AQR is used to regulate the power factor of the generator. For a command value, zero value is input to maintain a power factor of 1. The reactive power regulator inputs reactive power Qr and zero for the reactive power of the wind power generation apparatus and outputs an excitation current command value Iq0 for control.

A three-to-two phase coordinate transformer 32dqtrs-03 calculates a p-axis current detection value Ipr (active current component) and a q-axis current detection value Iqr (excitation current component) from the inputted current Ir and phase RTH of the rotor using conversion equations shown as equation (8) and equation (9); and then outputs the p-axis current detection value Ipr to a current regulator 3-ACR and the q-axis current detection value Iqr to a current regulator 4-ACR.

The regulator 4-ACR regulates the q-axis voltage command value Vqr which is to be outputted so that the deviation of the q-axis current detection value Iqr from the q-axis current command value Iq0 becomes zero.

The current regulator 3-ACR regulates the p-axis voltage command value Vpr which is to be outputted so that the deviation of the q-axis current detection value Ipr from the p-axis current command value Ip0 becomes zero.

The p-axis voltage command value Vpr and the q-axis voltage command value Vqr are input to a two-to-three phase coordinate transformer dq23trs-02. The two-to-three phase coordinate transformer dq23trs-02 calculates voltage command values Vur, Vvr, and Vwr (to be outputted by the transformer dq23trs-02) from the phase signal THr and each input value based on the conversion equations shown as equation (9) and equation (10), and then outputs them to a PWM calculating unit PWMr.

The PWM calculating unit PWMr calculates a pulse signal Pulse_inv, which turns on or off m semiconductor elements configuring the above-mentioned converter INV through the pulse-width modulation method, from inputted voltage commands Vur, Vvr, and Vwr; and then outputs it to the converter INV.

By applying the wind turbine controller shown in Embodiment 1 or Embodiment 2 to that according to Embodiment 5, the same effect as Embodiment 1 or Embodiment 2 can be obtained.

The present invention can provide a wind power generation system with variable rotating speed of a generator in the field of wind generation subject to large input fluctuation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A variable speed wind power generation system comprising:
   a wind turbine in which at least one blade is attached to a rotatable shaft;
   a generator having a rotor that rotates together with the shaft of the wind turbine;
   a power converter having an active switch for controlling electric power of the generator;
   blade angle change means for changing the angle of the blades according to a blade angle command value;
   generation power command means for generating a generation power command value based on a state quantity of the wind turbine; and
   generator control means for controlling the power converter in order to control the active switch;
   wherein the generation power command means determines a generation power command value based on a wind speed;
   wherein the generator control means includes means for controlling the active switch to regulate the generation power of the generator in order to change the generation power amount according to the generation power command value;
   wherein the generation power command means includes means for determining a blade angle from the current wind speed (U) and determining the generation power command value according to the determined blade angle; and
   wherein the generation power command means includes means for fixing the blade angle command value in a low wind speed range and fixing the generation power command value to a maximum output value in a high wind speed range.

2. A variable speed wind power generation system comprising:
   a wind turbine in which at least one blade is attached to a rotatable shaft;
   a generator having a rotor that rotates together with the shaft of the wind turbine;

a power converter having an active switch for controlling electric power of the generator;

blade angle change means for changing the angle of the blades according to a blade angle command value;

generation power command means for generating a generation power command value based on a state quantity of the wind turbine;

generator control means for controlling the power converter in order to control the active switch;

wherein the generation power command means determines a generation power command value based on a wind speed;

wherein the generator control means includes means for controlling the active switch to regulate the generation power of the generator in order to change the generation power amount according to the generation power command value;

wherein the generation power command means includes means for determining a blade angle from the current wind speed (U) and determining the generation power command value according to the determined blade angle; and means for detecting rapid reduction of wind speed;

wherein the generation power command means includes means for decreasing the generation power command value when the wind speed rapidly decreases.

3. A variable speed wind power generation system comprising:

a wind turbine in which at least one blade is attached to a rotatable shaft;

a generator having a rotor that rotates together with the shaft of the wind turbine;

a power converter having an active switch for controlling electric power of the generator;

blade angle change means for changing the angle of the blades according to a blade angle command value;

generation power command means for generating a generation power command value based on a state quantity of the wind turbine;

generator control means for controlling the power converter in order to control the active switch;

wherein the generation power command means determines a generation power command value based on a wind speed;

wherein the generator control means includes means for controlling the active switch to regulate the generation power of the generator in order to change the generation power amount according to the generation power command value;

wherein the generation power command means includes means for determining a blade angle from the current wind speed (U) and determining the generation power command value according to the determined blade angle; and means for changing the generation power command value so that the speed range in which generation operation is possible is not exceeded.

4. A variable speed wind power generation system comprising:

a wind turbine in which at least one blade is attached to a rotatable shaft;

a generator having a rotor that rotates together with the shaft of the wind turbine;

a power converter having an active switch for controlling electric power of the generator;

blade angle change means for changing the angle of the blades according to a blade angle command value;

generation power command means for generating a generation power command value based on a state quantity of the wind turbine;

generator control means for controlling the power converter in order to control the active switch;

wherein the generation power command means determines a generation power command value based on a wind speed;

wherein the generator control means includes means for controlling the active switch to regulate the generation power of the generator in order to change the generation power amount according to the generation power command value;

wherein the generation power command means includes means for determining a blade angle from the current wind speed (U) and determining the generation power command value according to the determined blade angle; and means for controlling a ratio of the average wind speed relative to the blade rotating speed to a predetermined value.

5. A variable speed wind power generation system comprising:

a wind turbine in which at least one blade is attached to a rotatable shaft;

a generator having a rotor that rotates together with the shaft of the wind turbine;

a power converter having an active switch for controlling electric power of the generator;

blade angle change means for changing the angle of the blades according to a blade angle command value;

generation power command means for generating a generation power command value based on a state quantity of the wind turbine;

generator control means for controlling the power converter in order to control the active switch;

wherein the generation power command means determines a generation power command value based on a wind speed;

wherein the generator control means includes means for controlling the active switch to regulate the generation power of the generator in order to change the generation power amount according to the generation power command value; and wherein the generation power command means includes:

means for obtaining a generation power command value and a rotating speed command value from the wind speed; and means for changing a blade angle command value according to the deviation of a rotating speed detection value from the rotating speed command value.

6. The variable speed wind power generation system according to claim 5, wherein the generation power command means includes means for increasing the generation power command value to a generation power command value obtained from the wind speed after the rotating speed deviation becomes smaller than a predetermined value.

7. The variable speed wind power generation system according to claim 5, further comprising means for changing the generation power command value so that the speed range in which generation operation is possible is not exceeded.

8. The variable speed wind power generation system according to claim 5, further comprising means for limiting the rotating speed command value within the speed range in which generation operation is possible.

9. The variable speed wind power generation system according to claim 5, further comprising means for controlling the ratio of the average wind speed relative to the blade rotating speed to a predetermined value based on the generation power command value.

10. The variable speed wind power generation system according to claim 5, further comprising means for controlling the ratio of the average wind speed relative to the blade rotating speed to a predetermined value based on the blade angle command value.

11. The variable speed wind power generation system according to claim 5, further comprising a reactive power control system that regulates reactive power to be outputted to a power system according to a reactive power command value from outside the power system.

12. The variable speed wind power generation system according to claim 5, wherein the generator includes an AC excited synchronous generator.

13. The variable speed wind power generation system according to claim 5, wherein the generator includes a synchronous generator.

14. The variable speed wind power generation system according to claim 5, wherein the generation power command means includes:
- means for obtaining a blade angle command value and a rotating speed command value from the wind speed; and
- means for changing the generation power command value according to the deviation of a rotating speed detection value from the rotating speed command value.

* * * * *